UNITED STATES PATENT OFFICE.

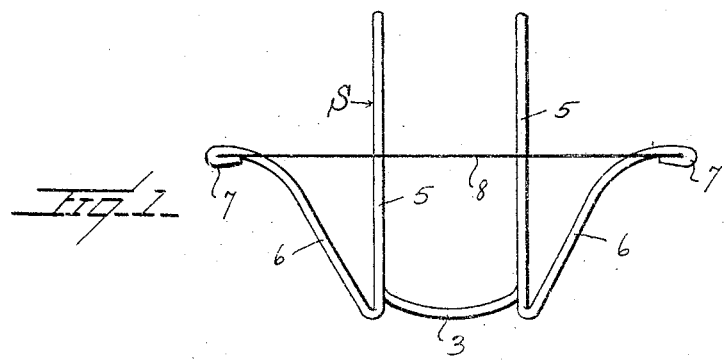
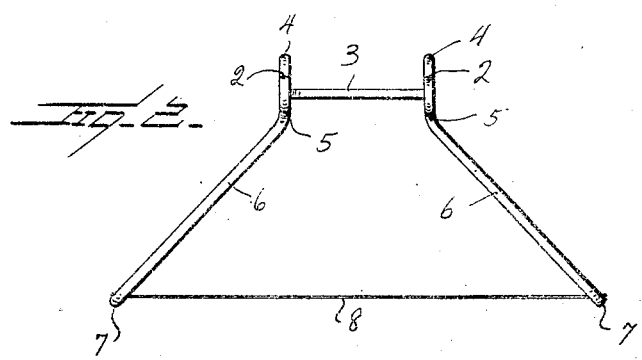
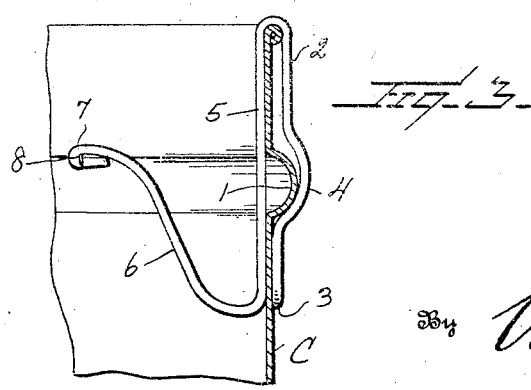

EDWARD R. STEVENS, OF WORCESTER, MASSACHUSETTS.

SCRAPER.

1,381,248.  Specification of Letters Patent.  Patented June 14, 1921.

Application filed May 5, 1920. Serial No. 379,035.

*To all whom it may concern:*

Be it known that I, EDWARD R. STEVENS, a citizen of the United States, residing at Worcester, in the county of Worcester and State of Massachusetts, have invented certain new and useful Improvements in Scrapers, of which the following is a specification, reference being had to the accompanying drawings.

This invention relates to certain improvements in scrapers and has relation more particularly to a device of this general character especially designed and adapted for use in connection with ice cream, and it is an object of the invention to provide a novel and improved device of this general character which may be readily and conveniently applied in working position upon the ice cream can and which can be effectively employed for the purpose of scraping off surplus ice cream from a dipper or other utensil.

The invention consists in the details of construction and in the combination and arrangement of the several parts of my improved scraper whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in front elevation of an ice cream scraper constructed in accordance with an embodiment of my invention;

Fig. 2 is a view in top plan of the device as herein embodied;

Fig. 3 is a view in side elevation and in applied position, the coacting portion of the can being shown in fragment.

As disclosed in the accompanying drawings, C denotes an ice cream can provided at its upper portion with the conventional rib 1.

S denotes my improved scraper in its entirety and which embodies a single strand of wire of requisite gage formed to provide the elongated arms 2 spaced apart about one inch and which have their lower end portions integrally connected by the connecting or transverse portion 3. Each of the straight portions or arms 2, at a point adjacent its lower or connected end, is provided with an outbow 4 which is adapted to engage over the rib 1 of the can whereby the scraper S is effectively maintained in applied position. The upper ends of each of the portions or arms 2 are continued by the turned straight portions or arms 5, substantially co-extensive in length with the adjacent straight portion or arm 2 and substantially co-planar therewith in a direction substantially perpendicular to the connecting portion 3. The lower or free ends of the portions or arms 5 are continued by the upwardly curved and outwardly and laterally inclined arms 6, possessing a certain degree of inherent resiliency. The arms 6 terminate in the eyes or loops 7 for a purpose to be hereinafter more particularly referred to.

When the scraper S is applied to the can C, the portions or arms 2 and 5 straddle or bridge the upper marginal portion of the can C and said portions or arms possess sufficient inherent resiliency to effectively or frictionally grip the opposed faces of the adjacent wall of the can.

In practice, it has been found of especial advantage to have the portions or arms 2 in relatively close proximity one to the other as by this arrangement, a single device may be employed with equal facility in connection with cans of different sizes.

8 denotes the scraping member, preferably wire, which has its opposite end portions disposed through the eyes or loops 7 with the extremities of said member or wire angularly disposed to facilitate the maintenance of the same in applied position. After the wire has been engaged with the eyes or loops 7, said eyes or loops 7 are preferably compressed to facilitate the gripping or holding action of the member or wire 8. In applying the member or wire 8, it is preferred that the arm 6 be slightly turned or crossed inwardly so that after the member or wire 8 has been applied, said arms 6, owing to the inherent resiliency thereof, impose a constant pull on said member or wire 8 and thereby maintaining the same taut.

With a scraper constructed in accordance with an embodiment of my invention, it has also been fully established in practice that when the same is in applied position, no hindrance or obstruction is offered to the requisite closing or covering of the can and is of particular advantage when the cream is served from the can at intervals.

From the foregoing description, it is thought to be obvious that a scraper constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:—

As an article of manufacture a scraper comprising a length of material bent adjacent its intermediate portion to provide spaced parallel arms, each of said arms having its intermediate portion extended back upon the arm in parallel relation thereto to provide a hook through the coöperation of the intermediate portion of said length, the end portion of the arm being extended outwardly and upwardly from the last mentioned portion of the arm, the end portion of each arm being disposed in divergent relation to each other, and means for connecting the extremity of said ends to each other.

In testimony whereof I hereunto affix my signature.

EDWARD R. STEVENS.